United States Patent
Chartet

[15] 3,694,899
[45] Oct. 3, 1972

[54] PROCESS FOR BRAZING PARTS OF ALUMINIUM AND ALUMINIUM ALLOYS

[72] Inventor: Andre Chartet, Meudon, France

[73] Assignee: Societe Anonyme des Usines Chausson, Asnieres, France

[22] Filed: Oct. 7, 1970

[21] Appl. No.: 78,971

[30] Foreign Application Priority Data

Oct. 22, 1969 France..................6936199

[52] U.S. Cl.....................................29/495, 29/502
[51] Int. Cl.........................B23k 31/02, B23l 35/36
[58] Field of Search..........29/492, 495, 502; 117/130

[56] References Cited

UNITED STATES PATENTS

| | | | |
|---|---|---|---|
| 2,001,186 | 5/1935 | Dornier | 29/492 |
| 2,418,265 | 4/1947 | Korpiun | 117/130 R X |
| 2,580,773 | 1/1952 | Heiman | 117/130 R |
| 2,650,886 | 9/1953 | Zelley | 117/130 R |
| 2,761,792 | 9/1956 | Wasserman | 117/130 R X |
| 2,850,441 | 9/1958 | Greene et al. | 117/130 R X |
| 2,966,448 | 12/1960 | Connor | 117/130 R X |
| 3,216,835 | 11/1965 | Saubestre | 117/130 R X |
| 3,284,323 | 11/1966 | Leloup | 117/130 R X |

FOREIGN PATENTS OR APPLICATIONS

| | | | |
|---|---|---|---|
| 730,602 | 3/1966 | Canada | 117/130 R |
| 825,317 | 11/1957 | Great Britain | 29/492 |
| 917,296 | 1/1963 | Great Britain | 29/502 |

*Primary Examiner*—John F. Campbell
*Assistant Examiner*—Ronald J. Shore
*Attorney*—Imirie & Smiley

[57] ABSTRACT

Process in which the parts to be brazed are dipped in an acidic or alkaline aqueous bath containing further a metallic salt or oxide thereof until the aluminum oxide is replaced by a metallic coating. The parts are then removed from the bath, then rinsed and dried to be assembled by brazing.

7 Claims, No Drawings

PROCESS FOR BRAZING PARTS OF ALUMINIUM AND ALUMINIUM ALLOYS

To braze parts of aluminum, possibly alloyed, relatively complex operations have to be successively performed. First the parts must be submitted to a cleaning and a pickling in acid and/or alkaline baths, then rinsed and dried, after which the parts are assembled and held in a support. The parts to be assembled are then submitted to a flux, to entirely pickle the alumina coating which always covers said parts. For fluxing the parts, there are three principal ways of processing namely: dipping the parts in a flux bath brought at the brazing temperature, that is about 600° C., this is done only after preheating the parts to prevent them from a thermic shock, or dipping the parts into a bath of aqueous flux compound, or alternatively by submitting the parts to the effect of a dry flux spraying. In both latter ways of processing, the parts, after they have been dipped and dried, are put into an oven where they are progressively heated up to the brazing temperature and then colled.

The fluxing process is presently an expensive process. Actually to ensure that the alumina coating covering the parts to be brazed, is completely removed when the parts are at the brazing temperature, important amounts of flux are used and said flux must contain expensive products, especially lithium chloride. Actually the amounts of flux depend on the thickness of the oxyde coating, generally said thickness is important because of the requirement to heat the parts in order to dry them both after pickling and after fluxing in an aqueous bath when said latter method is embodied.

Embodying the invention simplifies the brazing process and makes possible to use only small quantities of cheap flux now containing only small proportions of rare products such as lithium chloride, or more especially lithium halogenides.

According to the invention, it has been noticed that aluminum parts, when submitted to the effect of an acid or alkaline pickling bath and while being in that bath, are no longer covered with the alumina coating which covered them, but that this coating reappears immediately as soon as the parts are removed from the bath. Said alumina coating becoming the more thick and adherent that the parts, when removed from the pickling bath, have to be washed, dried, and assembled in an uncontrolled atmosphere.

The embodiment of the invention prevents the aluminum parts to be again covered with an alumina coating after the pickling process, and consequently only alumina traces may remain on those parts, which makes possible, during the brazing process to utilize only very small amounts of flux, said flux being further a non very active flux and containing no expensive metallic salts.

Consequently, after the brazing process, it is no more required to perform long washing periods of the brazed parts, since the flux remaining on brazed parts could not cause damages to said parts as it occurs when using a great quantity of active flux.

The invention provides a brazing process of parts made of aluminum and aluminum alloys wherein said parts are submitted at room temperature to the effect of an aqueous pickling bath to which is added a product selected from at least a metallic salt and oxide thereof which has become, due to the bath, less electro-negative than the aluminum possibly alloyed, said parts are held in the bath until removal of the aluminum oxide coating which cover said parts and replacement of this removed coating by a metallic coating from the bath, said parts are then removed, rinsed and dried, then assembled and submitted to fluxing and heating at brazing temperature to ensure their brazing.

Many other characteristics of the invention are appearent from the following detailed description.

For embodying the invention, an acidic or alkaline pickling bath is prepared with addition of metallic compounds from one or several metallic salts or oxides which, by means of a bath, are made less electro-negative than aluminum. As a general rule, it has been noticed that the more appropriate metallic salts or oxydes were zinc salts, particularly zinc oxide, zinc sulphate and zinc fluoborate, but eventually other salts can be used such as nickel chloride, tin chloride or also ferric chloride. The acid or alkaline bath has a composition similar to the baths usually used for pickling and cleaning aluminum parts. This bath is maintained at room temperature, the parts to be treated being dipped thereinto for variable period of time depending both on the bath reactivity and on the addition of metallic salts or oxides contained in the bath. Generally, this period of time is from half a minute to 5 minutes.

To better illustrates how the invention is embodyied, below are given examples of composition of pickling baths with additions utilized in the process embodying the invention.

EXAMPLE 1

Acid bath:
Aqueous solution of hydrofluoric acid at 1.5 percent
Zinc sulphate 750 g/l of the above solution
Temperature of use: 25° C.

EXAMPLE 2

Acid bath:
Aqueous solution containing for 1 liter of water
Zn fluoborate 150 g
Ni fluoborate 0.5 g
Ammonium chloride 20 g

EXAMPLE 3

Alkaline bath:
Aqueous solution containing for 1 liter of water

| soda | 300 g |
| Zn oxyde | 75 g |
| Na cyanide | 80 g |
| Cu cyanide | 3 g |

The parts being treated in the above baths have an even and tight covering of the added metal (s). These parts, after being removed from bath are rinsed and dried, for example in a low temperature stove - preferably lower than 150° C. and are ready to be assembled to be then submitted to a brazing process.

If it preferred to embody the invention process to the manufacture of heat exchangers, then the tubes, dissipators, collectors and other parts of which the core is made of, are assembled and held in an appropriate support or mounting. To perform brazing, several methods may be embodied.

A first method consists of preheating the assembled parts up to a temperature range from 300° to 400° C., this temperature however having to be lower than the melting point of the covering metal, that is if zinc is utilized, the melting point for this metal : 419° C. Afterwards the preheated parts are dipped into a bath of a brazing flux, brought to brazing temperature to ensure brazing of the assembly said bath could, for example, have the following composition:

| | |
|---|---|
| Ki Cl | 49 parts in weight |
| Na Cl | 27 parts in weight |
| Ca Cl$_2$ | 21 parts in weight |
| Al F$_3$ | 1.5 parts in weight |
| Li Cl | ≤2 parts in weight |

A second method consists of dipping said assembled parts in a aqueous flux solution, and immediately after their removal from said aqueous fluxing bath, to put them into a brazing oven in which the flux aqueous support is first evaporated and in which afterwards the parts are progressively brought to the brazing temperature, which is close to 600° C to ensure brazing of the assembly. A fluxing compound, which may be used in this second method, will have the following composition :

| | |
|---|---|
| K Cl | 36 parts in weight |
| Na Cl | 29 parts in weight |
| Li Cl | ≤10 parts in weight |
| Zn Cl$_2$ | 8 parts in weight |
| F$_3$ Al | 5 parts in weight |
| KH F$_2$ | 10 parts in weight |
| Water | 100 parts in weight |

The amount of flux to be used before the brazing process is then close or even lower than 50 g/m2 of the surface of the parts to be brazed.

The third method, being the most advantageous, consists of either before or after the parts assembling, to spray onto them through a flame, for example with a spray-gun, an anhydrous fluxing compound at least partially submitted to melting during the spraying process on the parts, said parts being afterwards heated into an air-oven, up to brazing temperature to ensure brazing thereof.

A fluxing compound which may be used in this third method will have the following composition :

| | |
|---|---|
| K Cl | 44 parts in weight |
| Na Cl | 36 parts in weight |
| Li Cl | 0.5 parts in weight |
| F$_3$ Al | 4 parts in weight |
| Zn Cl$_2$ | 6 parts in weight |
| KH F$_2$ | 9 parts in weight |

The weight of the deposited flux then is 20 g/m2.

As it appears from above, whatever be the method selected out from the three above mentioned methods to perform the brazing process, after the treatment of pickling and depositing of the protective metallic covering, it is possible to use low reactive fluxes according to the first method, or according to the second and third methods it is possible to use fluxes having an activity slightly lower than those generally used and in a substantially reduced amount. Besides, these fluxes contain only small quantities of lithium salts, consequently they are cheap by comparison with those being utilized in conventional brazing methods, when the treatment process of the invention is not into practice.

The invention is not limited to the embodiments indicated as examples, because various modifications can be effected thereto without being outside of the invention scope.

I claim:

1. Method of pickling, protecting and brazing aluminum and aluminum alloy articles comprising the steps of subjecting said articles to the action of an acidic or alkaline aqueous pickling bath at room temperature, said bath containing at least one metal compound which is then less electronegative than aluminum, maintaining said bath in contact with said articles for a sufficient time to effect removal of aluminum oxide coating present and replacement of said removed coating by a metal coating derived from the metal compound of said bath, rinsing, drying and subjecting said articles to the action of a brazing flux, positioning the articles in brazing relationship and, heating the article at brazing temperature whereby at least part of the metal deposited on the article is melted to braze the articles.

2. The method of claim 1 in which the metal compound of the bath is selected from the group consisting of zinc oxide, zinc sulfate, zinc fluoborate, and tin chloride.

3. The method of claim 1 in which said articles are immersed in an acidic aqueous bath containing per liter of solution 1.5 percent by weight of hydrofluoric acid and 750g of zinc sulfate, said bath being maintained at a temperature of about 25° C. and said articles being maintained immersed in said bath for a period of from about one-half minute to 5 minutes.

4. The method of claim 1 in which said articles are immersed in an alkaline aqueous bath containing, per liter of water, 300g soda, 75g zinc oxide, 80g sodium cyanide, and 3g copper cyanide, said bath being maintained at a temperature of about 25° C. and said articles maintained immersed therein for a period of from about one-half minute to about 5 minutes.

5. The method of claim 1 in which the step of fluxing includes hot spraying a powdered flux on said articles, whereby said flux is adhered to said article, said metal coating being zinc metal, said flux containing zinc oxide, said zinc metal compensating for any portion of the zinc oxide contained in said flux and in part destroyed by said hot spraying.

6. The method of claim 1 in which the step of fluxing includes immersing the articles in a flux bath which is either in a molten state or which is an aqueous suspension.

7. Method as set forth in claim 1, wherein an acidic aqueous bath is prepared said bath containing for each liter of water : 150 g of zinc fluoborate, 0.5 g nickel fluoborate and 20 g of ammonium chloride, and said articles are dipped for a period of time from half a minute to five minutes, the bath being maintained at a temperature of about 25° C.

* * * * *